April 13, 1943. H. KERSHAW 2,316,597
METHOD OF AND APPARATUS FOR WELDING
Filed Nov. 28, 1941 6 Sheets-Sheet 3

Inventor
Henry Kershaw.
By
Attorney

April 13, 1943.  H. KERSHAW  2,316,597
METHOD OF AND APPARATUS FOR WELDING
Filed Nov. 28, 1941  6 Sheets-Sheet 4

Inventor
By Henry Kershaw.
Attorney

Patented Apr. 13, 1943

2,316,597

UNITED STATES PATENT OFFICE 2,316,597

METHOD OF AND APPARATUS FOR WELDING

Henry Kershaw, Belleville, N. J.

Application November 28, 1941, Serial No. 420,876

38 Claims. (Cl. 219—4)

My invention relates to a method of and apparatus for welding.

An important object of the invention is to provide a method for welding pins, lugs, or other projections upon an article, and effect the welding quickly and cheaply.

A further object of the invention is to provide a method of the above-mentioned character employing a continuous length of wire or the like, from which the pins or projections are formed.

A further object of the invention is to provide a method of the above-mentioned character which will exert a limited pull upon the wire after the welding operation, and prior to severing of the wire, thus testing the strength of the weld for determining a faulty weld.

A further object of the invention is to provide a method of the above-mentioned character which will cause the pressure between the contacting parts to be welded, to follow through instantaneously upon the melting of such contacting parts, without the delay produced from inertia.

A further object of the invention is to provide a method of the above-mentioned character which may be practiced automatically, and in which the cycles of operation are repeated quickly and continuously.

A further object of the invention is to provide a method of the above-mentioned character for severing the length of wire or the like after it is welded to the article to produce a pin or projection of a desired length.

A further object of the invention is to sever the continuous wire so that its free end is tapered or pointed, thereby providing a high resistance when such free tapered end is brought into engagement with the article to which the wire is to be welded.

A further object of the invention is to provide automatic apparatus which may be used in the practice of the method.

A further object of the invention is to provide means to feed the wire or the like into contact with the article or work and to also serve as a connection with one side of a welding circuit.

A further object of the invention is to provide a guide to accurately locate the end of the wire with respect to the article or work, prior to its contact therewith so that the welding will occur at precisely the desired point.

Other objects and advantages of the invention will be apparent during the course of the following description.

In the accompanying drawings forming a part of this application and in which like numerals are employed to designate like parts throughout the same, Figure 3 is a vertical longitudinal section taken on line 3—3 of Figure 2, Figure 3ª is a transverse vertical section taken on line 3ª—3ª of Figure 3, Figure 3ᵇ is a central longitudinal section through the upper end of an operating lever, taken on line 3ᵇ—3ᵇ of Figure 3, Figure 7 is a transverse vertical section taken on line 7—7 of Figure 2, Figure 7ª is a diagrammatic view of the welding circuit and associated elements, Figure 9 is an exploded perspective view of the various elements constituting the wire feed means, Figure 10 is a vertical section taken on line 10—10 of Figure 2, the elements being in the raised position, Figure 10ª is a detailed section through the blades, showing the manner of severing the wire, Figure 11 is a similar view with the elements in the lowered position, Figure 12 is an exploded perspective view of the resilient dial supporting means and associated elements, and, Figure 12ª is a partly diagrammatic view illustrating the relative positions of the cams.

In the drawings, wherein for the purpose of illustration is shown a preferred embodiment of the apparatus, the numeral 20 designates a horizontal table above which is disposed a horizontal flat base 21 rigidly secured to the table 20 by vertical channel supports 22. The base 21 is spaced from the table 20 to provide room for the driving elements or mechanism of the machine.

Guide means is provided for the work, such as the dials 23 of watches. This guide means comprises a bottom strip 24, rigidly attached to the base 21 and side strips 25 disposed upon opposite sides of the bottom strip and rigidly attached to the base 21. The side strips 25 have upper inwardly projecting flanges 26 which overhang the bottom strip 24 and form with the bottom strip a guide passage 27 of the proper width to receive and guide the dials 23. The numeral 28 designates a vertical magazine for holding the dials 23 and feeding them downwardly by gravity. This magazine has inner grooves 29 near its bottom for receiving a sliding door 30, placed in position when the magazine is being filled, and removed when the magazine is placed in position with respect to the bottom strip 24, at which time the dials will move down so that the lowermost dial will be supported upon the bottom strip 24. The magazine 28 is provided at its bottom with outwardly projecting flanges 31, for insertion within longitudinal recesses 32 formed through the rear ends of the side strips 25, at their bottoms. The flanges 26 terminate short of the rear ends of the side strips 25 and the side strips are cut away forming walls 33, providing a recess for receiving the lower end of the magazine. This brings the inner walls of the magazine in alignment with the inner walls of the guide passage 27.

The magazine is removable, and means other than the preferred means, may be employed to hold it in place. By the use of the preferred means the magazine is placed in position by a forward movement of the magazine longitudinally of the strips 25.

Means are provided to effect a step-by-step feeding movement of the dials from the bottom of the magazine into a guide passage 27. This means includes a tubular holder 34, fitting within an opening 35 formed in a horizontal slide 36, and clamped therein by a set screw 37. The elevation of the tubular holder 34 may therefore be adjusted. The slide 36 reciprocates within horizontal guides 38. Mounted to reciprocate within the tubular holder 34 is a plunger 39, moved upwardly by a compressible coil spring 40, engaging a plug 41, screwed into the lower end of the tubular holder. The closed top of the tubular holder is provided with an opening 42, square in cross-section, for receiving a vertical dog 43, also square in cross-section, so that it cannot turn, and this dog is rigidly attached to the plunger 39. The dog 43 has an upper beveled face 44, extending upwardly in a forward direction. The elevation of the forward point of the face 44 is such that it terminates at the top surface of the lowermost dial 23, and the end of the vertical magazine extends downwardly to substantially meet the upper end of this top face. The arrangement is such that when the dog 43 is moved upon its forward stroke it will engage the end of the lowermost dial and feed it one step and when the dog 43 moves rearwardly its inclined face 44 will trip over the then lowermost dial within the magazine without feeding it rearwardly. In this manner dials are fed in succession from the bottom of the magazine, and a plurality of dials are fed longitudinally within and through the guide passage 27 in end-to-end contacting relation, so that each dial in the passage 27 is brought to the welding position. The feeding of the dial is intermittent and while the dial is at rest in the welding position, the welding action occurs, as will be explained. The means which reciprocates the slide 36 will be described hereinafter.

Figures 12, 12A:
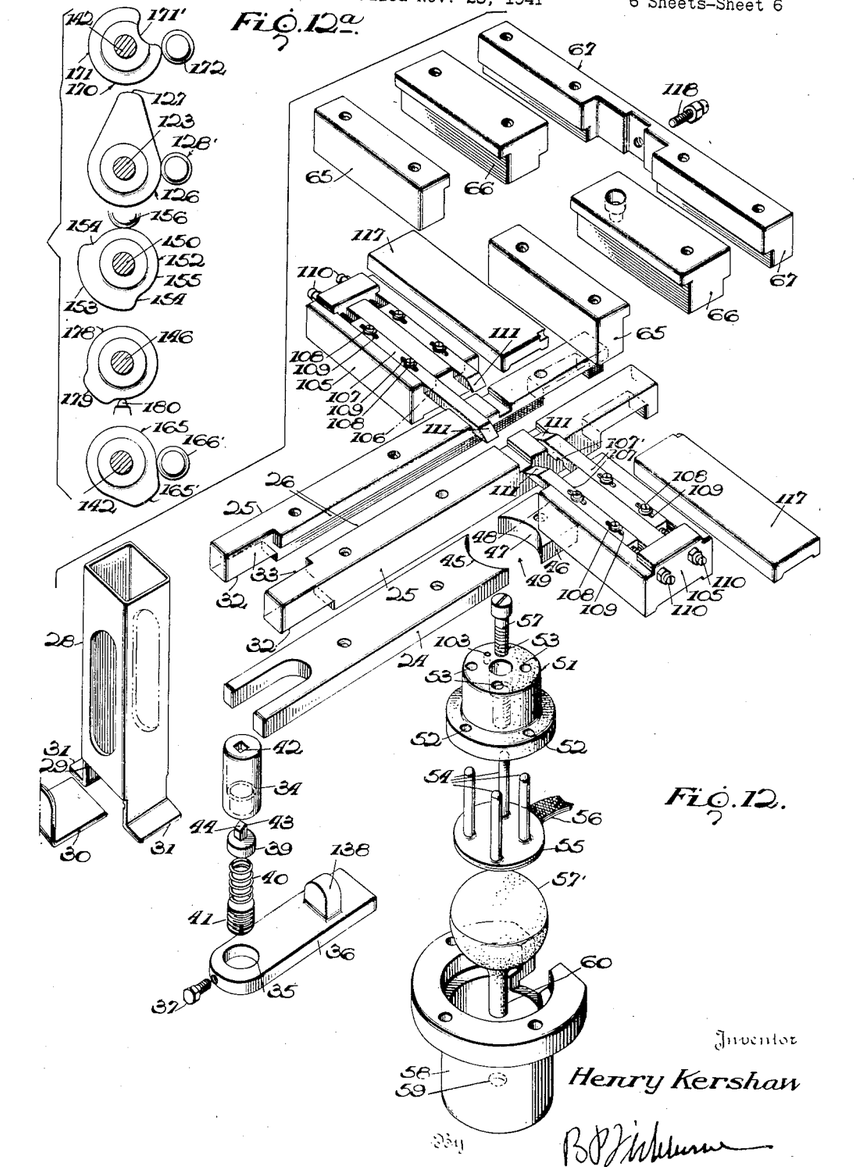

Means are provided to resiliently support the dial, when brought to the welding position. To effect this the bottom strip 24 is cut off at 45, Figure 12, and a separate bottom strip 46 is arranged beneath the flanges 26 at the elevation of the strip 24 and terminates at 47 and 48. The walls 45 and 47 being spaced provide an opening 49 to receive the dial, so that such dial is free to descend, but the flanges 26 prevent the dial from being moved upwardly beyond the normal traveling position. The horizontal base 21 is provided with an opening 50, Figures 3, 4, 5, 10, and 11, beneath the opening 49 and this opening receives a plug 51 of insulating material, and held in place by screws 52, engaging the base 21. The insulating plug 51 has vertical openings 53, receiving vertical reciprocatory metal plungers or pins 54, the upper ends of which are preferably tapered or rounded. The upper ends of the metal plungers 54 terminate at the elevation of the upper surface of the bottom strips 24 and 46. The plungers 54 are preferably arranged in a rectangular group although this arrangement may be varied and the lower ends of these plungers extend downwardly beyond the bottom of the insulating plug 51 and are rigidly secured to a metal plate 55. The plate is electrically connected with a flexible lead wire 56, connected with one side of a welding circuit. The upward movement of the plate 55 is limited by an adjustable stop screw 57, having screw-threaded engagement within the plug 51 and having its lower end arranged to contact with the plate 55. By adjusting this screw, the upward movement of the metal plungers 54 may be properly adjusted.

Resilient means are provided to support the plate 55 and its plungers, comprising a pneumatic ball or cell 57' held within a stationary housing 58, secured in place by screws 59'. This housing has an opening 59 for the passage of a tube 60, having free communication with a pressure tank 60'. A desired pressure is therefore maintained within the ball 57'. Pressure is supplied to the tank 60' through a pipe 60ª having a valve 60ᵇ, and the selected pressure within the tank 60' is ascertained by a gauge 60ᶜ. This selected pressure is transmitted to the ball or cell 57' so that such pressure may be maintained within the ball or cell, as stated. The pneumatic ball or cell 57' is disposed beneath the plate 55, as shown. It is thus seen that the dial 23 is brought to a position over the plungers 54 and is supported by these plungers at substantially the elevation of the upper surfaces of the bottom strips 24 and 46, its upward movement being limited by the flanges 26. When downward pressure is applied to this dial 23, prior to and during the welding step, as will be described, the plungers 54 and associated elements permit of the downward movement of the dial, and since the pressure which the plungers exert upon the dial is resilient, the dial is instantly shifted upwardly, when the contacting parts to be welded melt during welding, so that the pressure instantly follows through during the welding without any loss of time due to inertia. This action is due to the fact that the cell 57' is separate from the wire feed device, and further because the plate 55 and pins 54 are relatively light.

The numeral 61 designates a vertical guide device as a whole which is arranged oblique with respect to the guide passage 27. This guide device is generally H-shaped in cross-section, including sides 62 and an inner web 63. At its lower end the guide device has flanges 64, which are mounted upon stationary guides 65, 66, and 67, Figures 3 and 12, in turn rigidly mounted upon the horizontal base 21. The flanges 64 may be secured to these guides by bolts or the like. The guide device is so positioned with respect to the opening 49 that the wire feed device operates over this opening.

The wire feed device comprises a slide 68, mounted for vertical movement within grooves 69 formed in the sides 62, and held in place by straps 69'. The slide 68 has a knuckle 70 formed integral therewith, and this knuckle is straddled by a fork 71 including tines 72, and these tines pass through openings 73 formed in the slide. The slide 68 is in the form of a channel, and the tines extend into the recess of the slide and provide wire feeding dogs 74, having inclined faces which extend from the knuckle 70 in a downward direction. These dogs feed the wires as will be explained. The tines 72 are pivotally mounted upon the knuckle 70 as shown at 74'. The fork is provided with a tail or extension 75 and with an upwardly projecting split lug 76, having a screw-threaded opening to receive a stop screw 77, disposed to contact with the face of the slide 68. By adjusting the stop screw 77 the downward swinging movement of the dogs 74 with respect to the slide 68 may be regulated, for a purpose to be explained. The split lug has a transverse screw-threaded opening to receive a screw 78, to lock or clamp the stop screw 77 in the adjusted position. The slide 68 is reciprocated vertically by power applied to the extension 75. The fork 71 extends through an opening 79 formed in the transverse web 63 and this opening is sufficiently long to permit of the proper reciprocation of the fork 71 and associated elements. The extension 75 of the fork projects into an opening 80 formed in an operating slide 81, operating within grooves 82 and held in position by strips 83. The operating slide is connected with a vertical rod 84, which is reciprocated by means to be described.

The feed slide 68 has vertical grooves 85, to receive hard insulating strips 86, such as fiber. These insulating strips are held against vertical displacement with respect to the slide 68 by pins 87, rigidly attached to the slide 68 and slidable within openings 88 formed in the insulating strips. This arrangement causes the insulating strips 86 to reciprocate vertically with the slide 68, but permits of the same partaking of limited lateral movement with respect to the slide. These insulating strips grip wires 89 throughout the entire length of the strips. The dogs 74 engage the faces of the strips 86 opposite and remote from the wires 89. The wires 89 are held within grooves 90, formed in a jaw 91, preferably formed of copper. This jaw 91 is rigidly secured to the slide 68 by screws 92, which are thoroughly insulated from the jaw 91. The jaw 91 is also insulated at 92' and 93 from the slide 68 so that this jaw has no electrical connection with the slide 68. It is thus apparent that when the operating slide 81 moves the feed slide 68 downwardly, the dogs 74 will clamp the fiber strips to the wires 89 and positively feed the wires downwardly for the desired length, and when the slide 68 moves upwardly, there is still a limited amount of frictional engagement between the fiber strips 86 and the wires, which exerts a limited upward pull upon the wires, for a purpose to be explained. The extent of frictional engagement that the strips have with the wires will be regulated by adjustment of the stop screw 77. The jaw 91 is electrically connected with a flexible lead 94, connected with the other side of the welding circuit. The wires 89 are fed from spools and are passed about grooved guide pulleys 95, mounted upon the top of the guide device 61. The wires are under suitable tension so that they will feed properly and not too freely.

Rigidly secured to the lower end of the jaw 91 is an insulating bar or block 96, by means of screws 97 or the like. This insulating block has openings 98 for the passage of the wires 89. The openings 98 are accurate so that the wires are accurately held and guided. The insulating block carries downwardly tapering conical locating elements 99 and 100 which are adapted to enter openings 101 and 102 of the dial 23 and are held within openings 101' and 102' formed in the block 96, Figure 9. The elements 99 and 100 are insulated from the jaw 91. The purpose of these tapered pins is to locate the dial in the precise position prior to the engagement of the lower ends of the wires with the same so that the wires will be welded to the dials at the precise desired points, as there might be some tendency for the dials to become displaced to a limited extent within the guide passage 27. The insulating plug 51 will have recesses 103 for receiving the locating elements 99 and 100 respectively.

Figures 9, 10, 10A, 11:
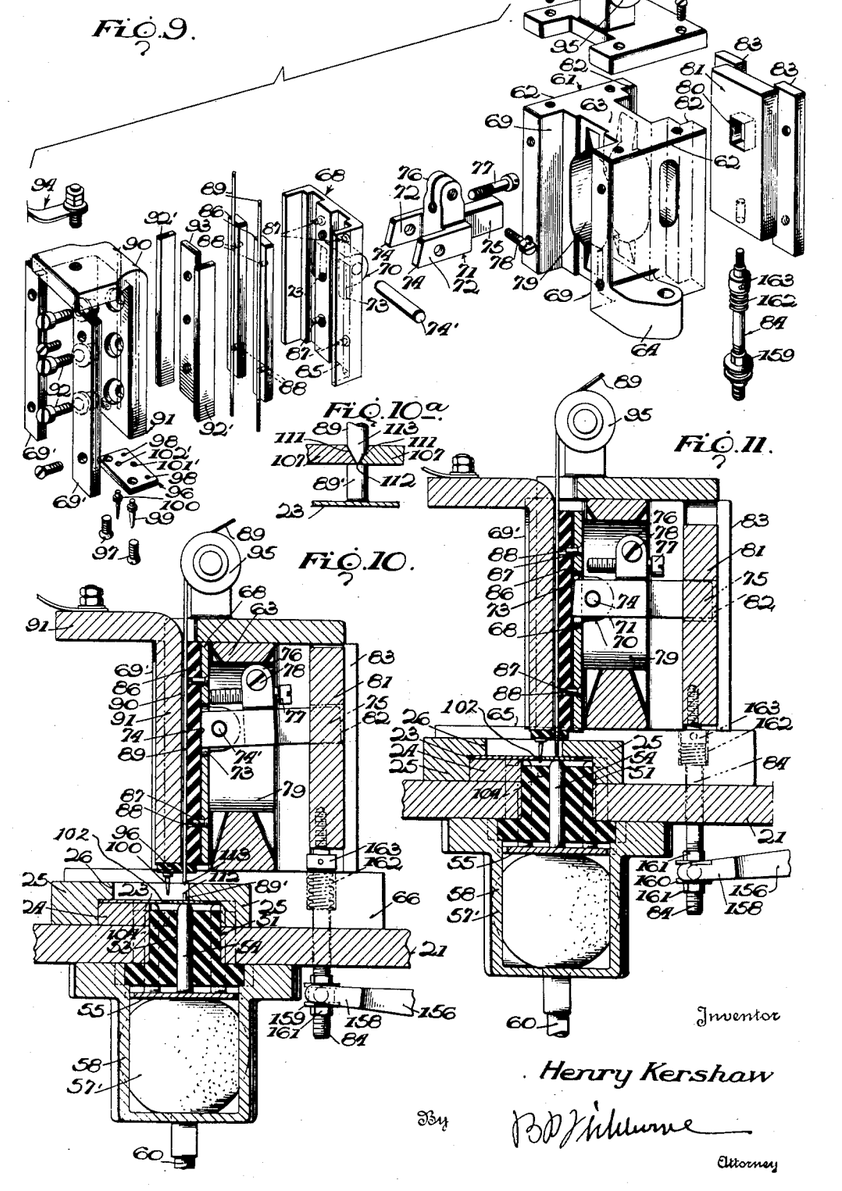

After the lower ends of the wires 89 are brought into engagement with the dial 23 and welded thereto, these wires are severed at points spaced from the upper surface of the dial to separate the attached pins from the wires. Operating within the guides 65 and 66 are opposed slides 105, having grooves 106 in their upper faces to receive horizontal blades 107 having elongated slots 108 for receiving clamping screws 109 engaging the slides. By this means the blades may be clamped to the slides in the selected adjusted position, and a fine adjustment is effected by screws 110, engaging the outer ends of the blades. These blades have inner beveled faces 111, the beveled faces being remote from the dial. When a pair of blades are moved together and severs the wire it produces a flat horizontal end 112 upon the attached pin 89' and a tapered end 113 upon the wire 89, Figure 10ª. One of the blades 107 in the forward pair should have a notch 107' on its lower side so that the rear pin may freely clear this blade, upon the next feed of the dial. Since there are two wires to be severed, there are two pairs of blades which are properly located for severing the wires. The slides 105 are rigidly connected with depending arms 114 operating within elongated openings 115 formed in the guides and these arms are moved outwardly by compressible coil springs 116. The means to move the arms 114 inwardly will be described later.

Mounted to reciprocate within the guides 66 and 67 are a pair of reciprocatory gates 117 which will cover the opening or passage between the edge 48 of the bottom strip 46 and the guide 67. When the gates 117 are in the inner position they support the dial after it has been moved forwardly from the bottom strip 46 and the leading end of this dial is brought into contact with a stop screw 118, which is adjustable. Since the dials are fed in a step-by-step manner in a row, the stop screw 118 will locate the dial in substantially the correct longitudinal welding position but the tapered locating pins will accurately locate the dial in the correct welding position, if it does not assume this position. After the leading dial is thus moved over the gates 117 and supported thereby, it is still held against upward movement by the flanges 26, and when the gates are moved outwardly the leading dial will then drop through the opening and enter a chute 119 and be conducted to a suitable location. The slides 117 are rigidly connected with depending arms 120 operating within elongated slots 121 and the arms are forced outwardly by springs 122. Means to move the gates 117 inwardly will be described later.

I will next describe the several driving means which actuate the different devices of the machine in timed order.

Figure 1:
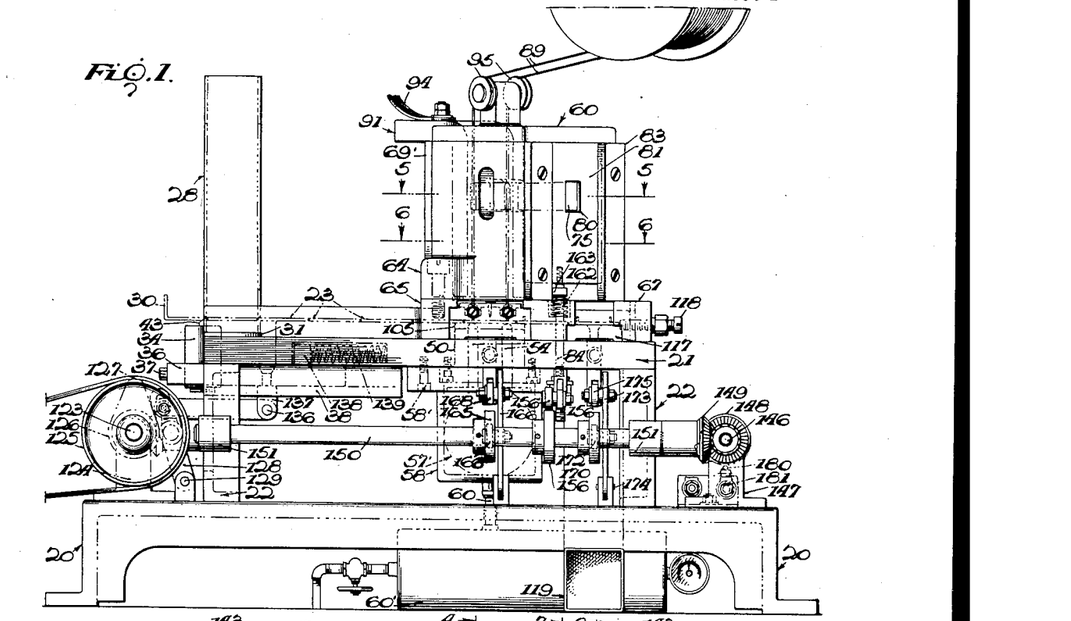
Figure 1 is a side elevation of a machine embodying my invention and which may be used in the practice of the method.
Figure 2:
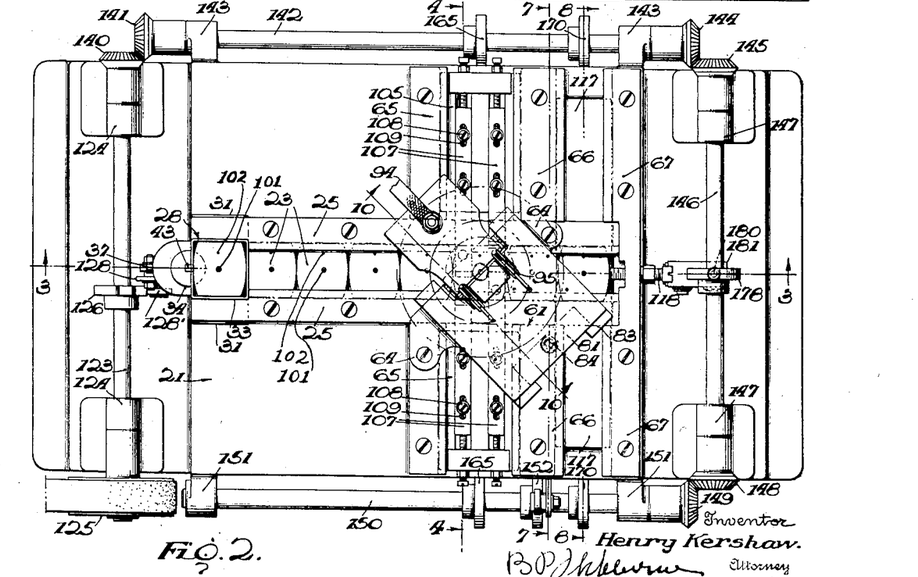
Figure 2 is a plan view of the same.
Figures 3, 3A, 3B:
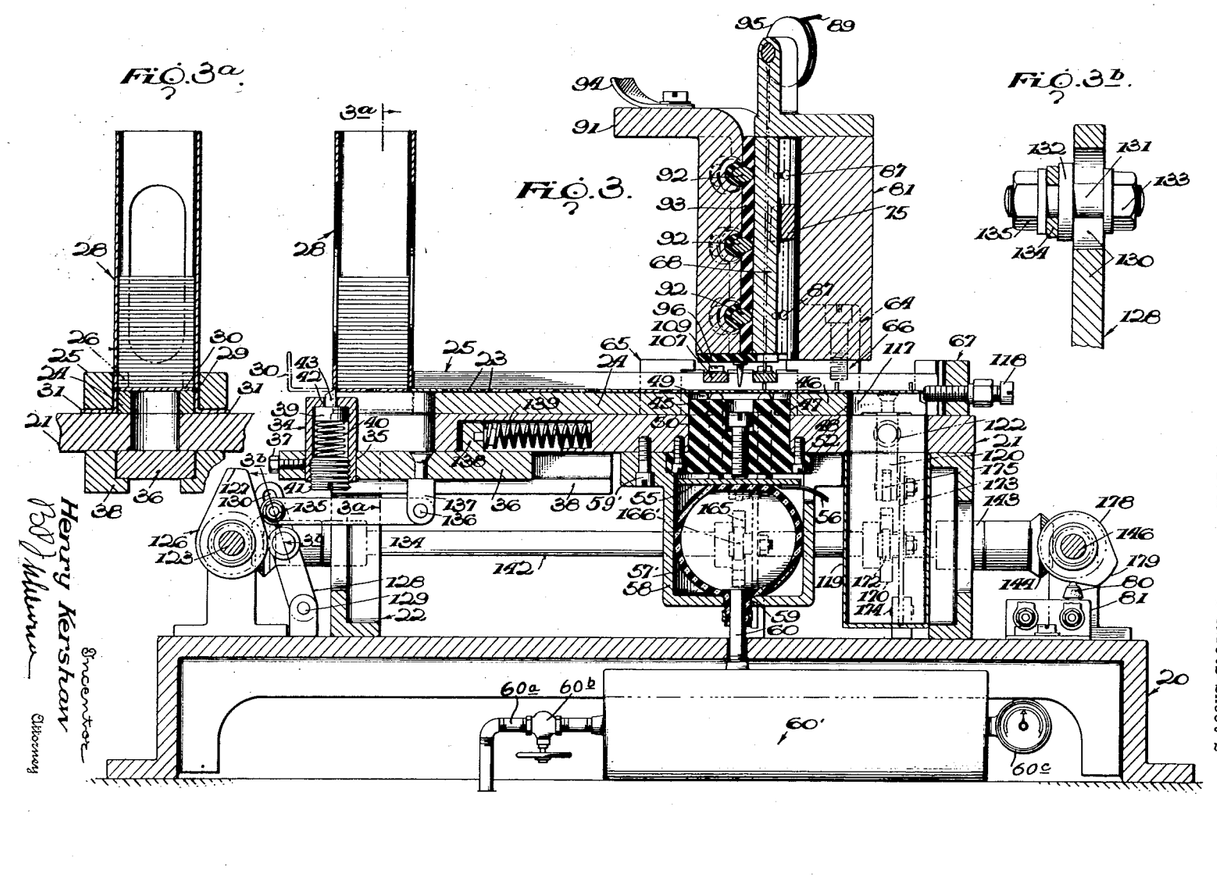
Figure 4:
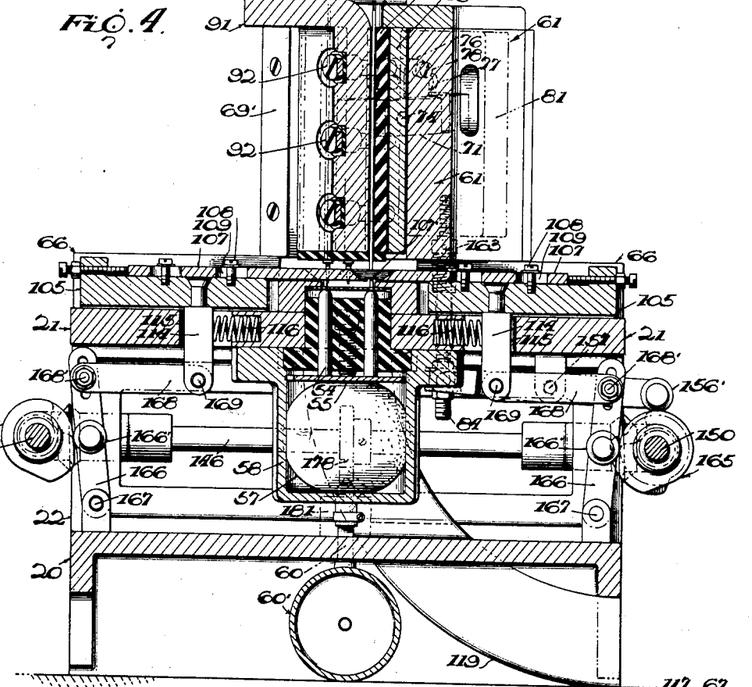
Figure 4 is a transverse vertical section taken on line 4—4 of Figure 2.
Figures 5, 6:
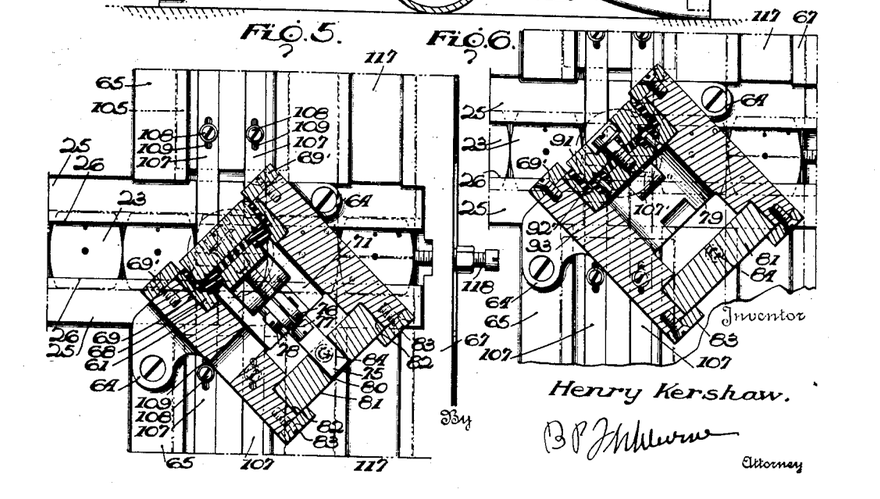
Figure 5 is a horizontal section taken on line 5—5 of Figure 1.
Figure 6 is a similar view taken on line 6—6 of Figure 1.

Arranged at the rear end of the machine is a transverse shaft 123 journaled in stationary bearings 124. This shaft is driven by a pulley 125 or the like receiving its rotation from any suitable source of power. Rigidly mounted upon the shaft 123 is a cam 126 having a high part 127 which is adapted to effect a quick intermittent step-by-step feeding movement of the dials. This cam is arranged to operate against a roller 128' carried by a vertically swinging lever 128 pivoted at its lower end as indicated at 129. The lever 128 is provided at its upper end with an elongated slot 130, Figure 3$^b$, to receive a pivot element 131 having a shoulder 132 and a nut 133. By tightening up the nut 133 the pivot element 131 may be clamped to the lever 128 in a selected longitudinal position, to regulate the stroke of the feed dog 43. A link 134 is freely pivoted to the element 131 and is held thereon by a nut 135. The link 134 is pivotally connected at 136 with a depending arm 137 which is rigidly secured to the slide 36. This slide has an upstanding lug 138 rigidly secured thereto engaged by a compressible coil spring 139. This spring moves the slide 36 outwardly and retains the roller 128' of the lever 128 in contact with the cam 126.

The shaft 123 carries a beveled gear 140 rigidly secured thereto, driving a beveled gear 141, rigidly secured to a shaft 142, journaled in stationary bearings 143. The shaft 142 drives a beveled gear 144, driving a beveled gear 145, carried by a shaft 146, journaled in bearings 147. The shaft 146 drives a beveled gear 148, driving a beveled gear 149. This beveled gear rotates a shaft 150, journaled in bearings 151. Rigidly mounted upon the shaft 150 is a cam 152, having a long high part 153. The high part has steep inclines 154 leading to a low part 155. The cam 152 is arranged beneath a lever 156, pivoted between its ends at 157, and having a roller 156'. The free end of the lever is forked at 158 to enter a groove 159 formed in a spool 160, having screw-threaded engagement with the lower end of the rod 84 and the spool 160 is held against displacement by lock nuts 161. The cam therefore moves the rod 84 downwardly while this rod is moved upwardly by a spring 162 engaging a collar 163 rigid upon the rod and the spring engages a stationary abutment 164. When the high part 153 of the cam engages the roller 156', the slide 68 is quickly moved downwardly to bring the lower ends of the wires into contact with the dial and the high part of the cam retains the lower ends of the wires in contact with the dial for a prolonged period during the welding step and until the welding step is completed, after which the cam quickly releases the lever and the spring 162 will quickly return the feed slide 68 to the raised position.

Rigidly mounted upon the shafts 142 and 150 are cams 165 having high parts 165' arranged to engage rollers 166' carried by levers 166, pivoted at their lower ends, as shown at 167. The levers 166 are pivoted to links 168, at 168', and these pivots are adjustable longitudinally of the levers 166 as described in connection with the lever 128. The links 168 are pivoted to the arms 114, as shown at 169. The springs 116 retain the rollers 166' in engagement with the cams 165.

Rigidly mounted upon the shafts 142 and 150 are cams 170, having high parts 171 and low parts 171', to engage rollers 172 carried by levers 173. These levers are pivoted at their lower ends as shown at 174. At their upper ends the levers 173 are pivotally connected with links 175, as at 176, and the pivotal connection is the same as described in connection with the lever 128. The links 175 are pivotally connected at 177 with the arms 120. The cams 165 rotate in opposite directions and the cams 170 rotate in opposite directions.

Figures 7, 7A:
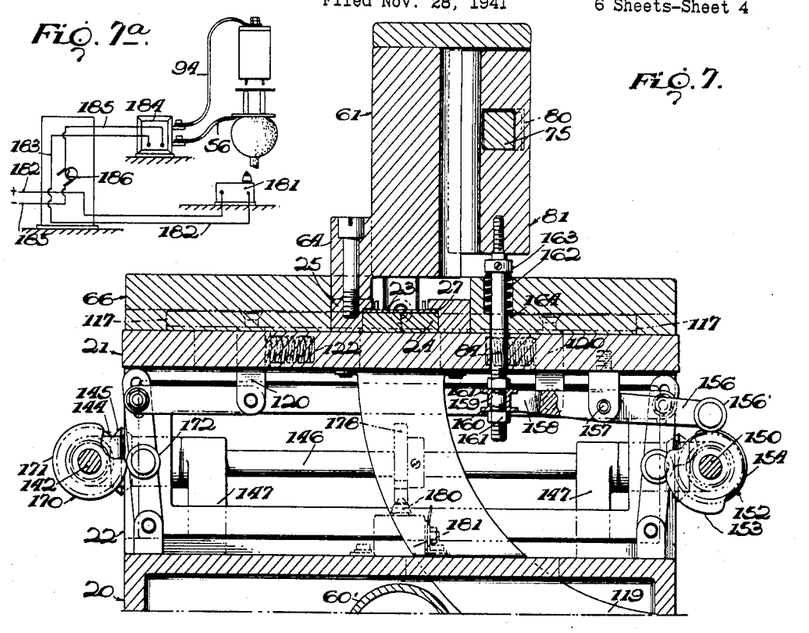
Figure 8:
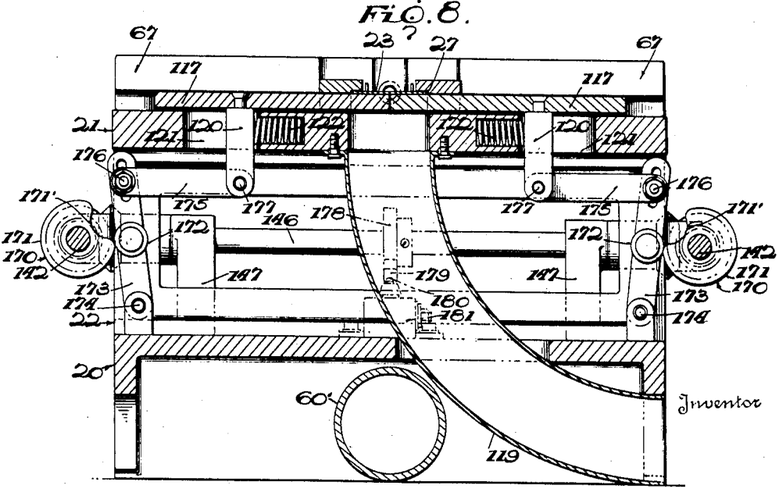
Figure 8 is a transverse vertical section taken on line 8—8 of Figure 2.

A welding circuit includes a wire 182, having the switch 181 connected therein. This wire 182 is connected with a wire 183, connected with one end of the primary coil of a transformer 184. The opposite end of this transformer is connected with a wire 185, having a time operated switch 186 connected therein.

Rigidly mounted upon the shaft 146 is a switch cam 178 having a high part 179 to depress button 180 of switch 181, such as a micro switch. When the button 180 is depressed the circuit is closed by the switch at one point.

Broadly, the cycle of operation of the machine is as follows:

The leading dial is dropped and the doors are closed, the row of dials is fed a step to bring the then leading dial into engagement with the stop screw, the wires are fed downwardly to engage with the dial resiliently supported at the welding position, the welding step occurs, the welded wires are subjected to an upward pull, and the wires are then severed at points spaced from the dial.

In starting the machine, the guide passage 27 is completely filled with the dials 23, the leading dial contacting with the stop screw 118 and the trailing dial being arranged in advance of the feed dog 43. The dials between the dial at the welding position and the leading dial, may or may not have the pins formed thereon. With the machine thus loaded, upon the starting of the machine, the cams 170 will permit of the opening of the slide doors 117 by the springs 122, when the rollers 172 enter the low portions 171'. The leading dial will then drop into the chute. The sliding doors are quickly closed after the leading dial is dropped. The cam 126 will now quickly advance the dog 43 which engages the trailing dial and feeds the row of dials to the next position with the leading dial engaging the stop screw 118. The next dial is thereby brought to the welding position and is supported by the plungers 54. The high point 127 of the cam 126 now disengages the roller 128' and the dog 43 is returned to the rear position and remains stationary. The cam 152 now has its high part 153 brought into engagement with the roller 156' and the lever 156 is turned upon its pivot so that the rod 84 is moved downwardly. The rod 84 is moved downwardly quickly and is held in this lowered position during and until the welding step is completed. When the rod 84 moves downwardly the slide 68 is moved downwardly and the dogs 74 press upon the insulating strips 86, which move downwardly with the slide. The insulating strips 86 now have proper frictional engagement with the wires 89 to positively move them downwardly and the lower ends of the wires 89 are therefore brought into engagement with the dial supported by the plungers 54. These plungers exert a constant resilient pressure upon the dial. The pressure between the dial and the lower ends of the wires is a low pressure, and I have found that a pressure of from between 10 to 15 pounds is preferred. A low pressure permits of the welding operation by using a current of less amperage while a fixed voltage is employed. If the pressure is materially increased, I have found that the amperage must be increased. Satisfactory results are obtained by using a low voltage, such amps., although the amperage may be varied, but the invention is in no sense restricted to as around 3 volts, with about 4 to 5 thousand this voltage. As soon as the lower ends of the wires are brought into contact with the dial and the resilient pressure between the lower ends of the wires and the dial established, the high part 179 of the switch cam 178 will depress the button 180 and close the switch. The welding circuit is thus closed and during the welding action the cam 152 retains the wires in the lowered position. The duration of the welding time is controlled by a timer operating with the switch 181. The welding is preferably effected in from 1 to 2 cycles after which the timer will open the welding circuit while the switch 181 may still remain closed but this switch will open shortly after the completion of the welding operation. When the welding current is applied to the contacting ends of the wires and the dial, the welding occurs and the metal melts, and the resilient action of the ball 57' and plungers 54 cause the pressure to be carried through during the welding when the metal is rendered plastic. This pressure is carried through instantly without delay due to inertia. This is important because if the pressure is not carried through instantly arcing will result and the metal will burn. Upon the completion of the welding step, the cam 152 has rotated so that its high part 153 disengages the roller 156' and the roller may then engage the low part of the cam which is effected by the action of the spring 162, moving the rod 84 upwardly. Upon the upward movement of the rod 84, the fiber strips 86 will exert a limited upward pull upon the wires, which have been welded to the dial, because these fiber strips have a selected frictional engagement with the wires. This is not a binding frictional engagement for the fiber strips will slide upwardly along the wires but the frictional engagement is sufficient to exert a selected upward pull upon the wires while the dial is held against upward movement. The purpose of this is to subject the weld to a pull and thereby determine if it has been properly made. By the time the rod 84 has reached the uppermost position, the cams 165 have their high parts 165' brought into engagement with the rollers 166' and the blades 107 are quickly moved inwardly and sever the wires to separate the pins 89' from the wires. After the cutting action, these cams allow the rollers 166 to move outwardly and the springs 116 quickly return the cutters 107 to the open position. In cutting the wires, Figure 10ª, the blades form the flat ends 112 upon the pins 89' and the pointed ends 113 upon the lower ends of the wires 89. The tapered ends of the wires increase the electrical resistance during the welding period. The cycle of operation is then repeated.

It is to be understood that changes may be made in the order of the steps of the method, and that various changes in the shape, size, and arrangement of parts may be resorted to in the apparatus, without departing from the spirit of my invention or the scope of the subjoined claims.

Having thus described my invention, what I claim is:

1. The method of attaching a pin to a metal article, comprising resiliently supporting the article against movement in one direction, cutting the end of a wire to produce a tapered end, moving the wire so that its tapered end is brought into contact with the article and produces a force upon the article in opposition to the action of the resilient supporting and for causing a pressure between the tapered end of the wire and the article, applying a welding current to the contacting tapered end of the wire and the article, and severing the wire at a point spaced from the article to separate the attached pin from the wire and to form a tapered end on the wire.

2. The method of attaching a pin to a metal object, comprising supporting the metal object in a welding position, holding a wire so that its longitudinal axis is generally at a right angle to the surface of the metal object to which the pin is to be attached and moving the held wire longitudinally so that its free end is brought into contact with the surface of the object, subjecting the contacting end of the wire and the object to a welding current to weld the same together, first exerting a longitudinal pull upon the wire after the welding action in an opposite direction to the said longitudinal movement of the wire for determining the strength of the weld, and then severing the wire at a point spaced from the object to separate the attached pin from the remaining wire.

3. The method of attaching a pin to a metal object, comprising holding the article and wire so that the longitudinal axis of the wire is at generally a right angle to the surface of the object to which the free end of the wire is to be attached, effecting a relative movement between the object and wire in a direction longitudinally of the held wire to cause the free end of the wire to contact the surface of the object and produce pressure between the same, subjecting the free contacting end of the wire and article to a welding current so that they are welded together, first effecting a relative pulling action between the wire and article in a direction longitudinally of the held wire to test the strength of the weld, and then severing the wire at a point spaced from the face of the article to separate the attached pin from the remaining wire.

4. In apparatus for attaching a pin to a metal article, an element to oppose the movement of the article in one direction, resilient pneumatic means to move the first named element in one direction, means to move the end of a wire into contact with the face of the article and to cause pressure between the contacting parts of the end and face, means for supplying a welding current to such contacting parts, and means to sever the wire after the welding operation to separate the attached pin from the wire.

5. In apparatus for attaching pins to metal articles, means for supporting and advancing in succession a plurality of metal articles to a welding position, resilient means to support each article when shifted to the welding position, means to engage a wire and bring the end of the wire into contact with the face of the article and exert a pressure upon the article in opposition to the action of the resilient supporting means and thereby cause a pressure between the contacting parts of the wire and article, means to supply a welding current to the contacting parts of the wire and article, and means to sever the wire after the welding action to separate the attached pin from the wire.

6. In apparatus for attaching a pin to a metal article, a support, plunger means carried by the support, resilient pneumatic means supporting the plunger means, means to advance the article to a position over the plunger means to be supported thereby, means engaging a wire to advance the same and bring the end of the wire into contact with the face of the article and to create pressure between the contacting parts of the wire and article, means to subject the contacting parts to the action of a welding current, and means to sever the wire to separate the attached pin from the wire.

7. In apparatus of the character described, a resilient support, means to advance an article to position the same upon the resilient support, means to support a strand of wire, a reciprocatory element to engage the strand of wire and advance the same toward the support to bring the end of the wire into contact with the face of the article, the reciprocatory element also having frictional engagement with the wire when it is moved from the resilient support, means for supplying a welding current to the contacting parts of the wire and article, and means to sever the wire after the welding action.

8. In apparatus for attaching a pin to an article, means for supporting the article, means to hold a wire so that its longitudinal axis is disposed generally at a right angle to the surface of the article to which the wire is to be welded, means to operate the holding means so that the end of the wire is brought into engagement with the surface of the article, means to supply a welding current to the contacting end of the wire and the surface of the article, and means spaced from the surface of the article to sever the wire and also produce a tapered end upon the remaining wire when the attached pin is severed therefrom.

9. In apparatus for attaching a pin to an article, means for supporting the article, means to hold a wire so that its longitudinal axis is generally at a right angle to the surface of the article to which the wire is to be welded, means to operate the holding means so that the end of the wire is brought into contact with the surface of the article, means to supply a welding current to the contacting end of the wire and the surface of the article, and means to sever the wire including blades spaced from the surface of the article and movable generally parallel with said surface, said blades having beveled edges arranged remote from the surface of the article, the beveled edges producing a tapered end upon the wire when the pin is severed from the same.

10. In apparatus for attaching a pin to an article, means to support the article, means to engage a wire and bring its free end into engagement with the article, a locating device having an opening to receive the end of the wire, and means to move the locating device as the wire is brought into close relation to the article so that the contact is made at the precise position upon the article, means to supply a welding current to the contacting parts of the wire and article, and means to sever the wire.

11. Apparatus for attaching a projection to an article comprising a guide device to receive the article, means to move the article in the guide device to a welding position, a device arranged near the welding position and adapted to move a wire into contact with the article, locating means carried by the device to engage with the article and properly locate the same prior to the contact between the wire and article, means to supply a welding current to the contacting wire and article, and means to sever the wire.

12. Apparatus for attaching a projection to an article comprising, a guide device to receive the article, means to move the article in the guide device to a welding position, a reciprocatory device arranged near the welding position and having frictional engagement with a wire to move the end of the wire into contact with the article, a tapered locating element carried by the reciprocatory device to enter an opening in the article, means to supply a welding current to the contacting wire and article, and means to sever the wire.

13. Apparatus for attaching a projection to an article comprising, means to move the article to a welding position and support the article in such position, a movable device arranged near the welding position and having frictional engagement with a wire to move one end of the wire into contact with the article, said movable device including a metallic part in contact with the wire, the metallic part having electrical connection with a welding circuit and the first named means having electrical connection with the welding circuit so that a welding current is supplied to the wire and article when they contact.

14. Apparatus for attaching a projection to an article comprising, means to support the article in a welding position and having electrical connection with a welding circuit, a movable device arranged near the welding position and including a metallic part to engage with a wire, an element to have frictional engagement with the wire to feed the wire when the device is moved toward the article, the metallic part having electrical connection with the welding circuit so that a current is supplied to the contacting wire and article, means to act upon the friction element and to move the device, and means to sever the wire.

15. Apparatus for attaching a projection to an article comprising, means to support the article in a welding position and having electrical connection with a welding circuit, a reciprocatory member arranged near the welding position and movable toward and from the article supported at the welding position, a jaw mounted upon the reciprocatory member and having a metallic part to contact with a wire, the metallic part being electrically connected with the welding circuit so that a welding current is supplied to the contacting wire and article, a friction element mounted upon the reciprocatory member and contacting with the wire, means operated upon the movement of the member toward the article to actuate the friction element so that it has a binding engagement with the wire and means to sever the wire at a point spaced from the article.

16. Apparatus for attaching a projection to an article comprising, means to support the article in a welding position and having electrical connection with a welding circuit, a reciprocatory member arranged near the welding position and movable toward and from the article at the welding position, a metallic part mounted upon the reciprocatory member and contacting with a wire and having electrical connection with the welding circuit, a friction element mounted upon the member and contacting with the wire, means to increase the frictional engagement between the friction element and wire when the reciprocatory member moves toward the article and to decrease such frictional engagement when the reciprocatory member moves from the article, and means to sever the wire.

17. Apparatus for attaching a projection to an article comprising, means to support the article in a welding position and having electrical connection with the welding circuit, a guide arranged near the welding position, a carriage mounted upon the guide and movable toward and from the article at the welding position, a metallic element mounted upon the carriage and engaging a wire to be fed to the article, a friction element mounted upon the carriage and engaging the wire, a pivoted lever mounted upon the carriage and having a part engaging the friction element, and a reciprocatory member engaging the pivoted lever to swing it upon its pivot and to reciprocate the carriage.

18. Apparatus for attaching a projection to an article comprising, a guide device to receive the articles, means to intermittently advance the articles within the guide device, means to support each article when shifted to the welding position, said means having electrical connection with a welding circuit, a guide arranged near the welding position, a carriage mounted upon the guide and movable toward and from the article, a metallic part mounted upon the carriage and contacting with a wire and having electrical connection with the welding circuit, a friction element mounted upon the carriage and movable longitudinally with it and laterally shiftable with relation to the carriage, a lever pivoted upon the carriage and having a dog to engage the friction element, the dog increasing the frictional engagement between the friction element and the wire when the lever is swung downwardly with respect to the the carriage, means to limit the upward movement of the lever with respect to the carriage to provide a reduced frictional engagement between the friction element and wire when the carriage moves from the article, means to move the carriage, and means to sever the wire.

19. Apparatus for attaching a projection to an article comprising, a guide device to receive the articles, means to advance the articles within the guide device, means to support each article when shifted to the welding position, said means having electrical connection with a welding circuit, a guide arranged near the welding position, a carriage mounted upon the guide and movable toward and from the article, a metallic jaw mounted upon the carriage and contacting with a wire and having electrical connection with the welding circuit, a friction element mounted upon the carriage and movable longitudinally with it and laterally shiftable with relation to the carriage, a lever pivoted upon the carriage and having a dog to engage the friction element, the dog increasing the frictional engagement between the friction element and wire when the lever is swung downwardly with respect to the carriage, an adjustable stop screw secured to the lever to contact with the carriage to limit the upward swinging movement of the lever with relation to the carriage, a second guide, a second carriage mounted to reciprocate upon the second guide and having an opening to receive the end of the lever, means to reciprocate the second carriage, and means to sever the wire.

20. Apparatus for attaching a projection to an article comprising, a guide device to receive the articles and having flanges which overlap the article when shifted to a welding position, means to advance the articles within the guide device, metallic means arranged at the welding position for supporting the article and having electrical connection with a welding circuit, resilient means engaging the metallic means, a reciprocatory device arranged near the welding position and engaging a wire to feed the same into contact with the article and to exert a pull upon the wire in a direction from the article after the welding operation, the article being held by the flanges against displacement during the pulling action, means for connecting the wire with the welding circuit, and means to sever the wire.

21. Apparatus for attaching a projection to an article comprising, a guide device to receive the articles, supporting means arranged at the welding position for supporting each article at the welding position, resilient means acting upon the supporting means, means to advance the articles within the guide device, a movable device arranged near the welding position and engaging a wire to feed the same into contact with the article, means for connecting the wire and article in a welding circuit, and means to sever the wire.

22. Apparatus for attaching a projection to an article comprising, a guide device to receive the articles, a magazine arranged near the rear end of the guide device for holding the articles, means to remove the articles from the magazine and feed them through the guide device, a stop element at the rear end of the guide device to engage the leading article, means to support the leading article and to discharge the same from the guide device, means for supporting each article when shifted in the guide device to the welding position, a member engaging a wire and moving the same into contact with the article supported by the supporting means, means for supplying a welding current to the wire and article, and cutting means to sever the wire after the welding step.

23. Apparatus for attaching a projection to an article comprising, a guide device to receive the articles, a magazine arranged near the rear end of the guide device for holding the articles, a reciprocatory device operating near the magazine, a dog carried by the reciprocatory device to engage the lowermost article therein and advance the same, an insulating member arranged at the welding position of the guide device, metallic supporting means mounted upon the insulating member to support each article as it reaches the welding position, a pneumatic cell acting upon the metallic supporting means, means connecting the metallic supporting means with a welding circuit, a guide arranged near the welding position, a carriage mounted upon the guide and shiftable to and from the article at the welding position, means carried by the carriage to grip a wire and feed the same into contact with the article and including a metallic member connected with the welding circuit, reciprocatory blades arranged to engage with the wire at a point spaced from the article to sever the wire, and means to move the blades.

24. Apparatus for attaching a projection to an article comprising, a substantially horizontal guide device to receive the articles, a magazine arranged near the rear end of the guide device for holding the articles, a reciprocatory device to engage the articles and feed the same from the magazine into the guide device, a reciprocatory plunger arranged at the welding position, a pneumatic cell supporting the reciprocatory plunger so that the plunger supports each article when shifted to the welding position, an upstanding guide arranged above the guide device and near the welding position, a reciprocatory carriage mounted upon the upstanding guide, wire gripping means mounted upon the carriage so that a wire is fed downwardly to contact with the article, substantially horizontal blades disposed at an elevation near and spaced from the article, said blades having upper beveled faces, and means to move the blades, and means to supply a welding current to the wire and article.

25. Apparatus for attaching a projection to an article comprising, a substantially horizontal guide device to receive the articles, a magazine arranged near the rear end of the guide device for holding the articles, means to feed the articles from the magazine into the guide device, a pneumatic cell arranged near the welding position, means carried by the pneumatic cell to support each article when shifted to the welding position, an upstanding guide arranged above the guide device and near the welding position, a reciprocatory carriage mounted upon the upstanding guide, wire gripping means mounted upon the carriage, substantially horizontal blades disposed at an elevation above and spaced from the article, stop means arranged at the forward end of the guide device, an article supporting device arranged adjacent to the stop means, means to operate the article feed means, the carriage, blades and article supporting device in timed order, and a welding circuit for connection with the article and wire.

26. Apparatus for attaching a projection to an article comprising, a substantially horizontal guide device to receive the articles, means to feed the articles into the rear end of the guide device, means to support each article at the welding position, an upstanding guide arranged above the guide device near the welding position, a reciprocatory carriage mounted upon the guide device, wire gripping means mounted upon the carriage, substantially horizontal blades disposed at an elevation above the article, stop means arranged at the forward end of the guide device, an article supporting device arranged adjacent to the stop means and to be operated to drop the leading article, a welding circuit connected with the article and wire, means to close the welding circuit, and means to operate the article feeding means, the carriage, blades, article supporting device and circuit closing means, in timed order.

27. Apparatus for attaching a projection to an article comprising a guide device, means to feed the articles into the guide device, a guide arranged near the guide device, a carriage mounted to move upon the guide, an elongated rigid friction strip extending longitudinally of the carriage to engage with a wire to be fed by the carriage, means connecting the friction strip with the carriage so that it moves with the carriage and is shiftable laterally with relation to the carriage, a metallic jaw mounted upon the carriage and disposed opposite the friction strip so that the wire is held between the jaw and friction strip, the metallic jaw being connected with a welding circuit, means mounted upon the carriage to shift the friction strip toward the jaw, means for connecting the article in the welding position with the welding circuit, and means to sever the wire.

28. Apparatus for attaching a projection formed from a wire to an article comprising, a support, an insulating plug mounted upon the support and having openings, plungers slidable within the opening and serving to support an article in the welding position, a pneumatic cell arranged beneath the plungers and moving them upwardly, a pressure storage tank having communication with the cell, means connecting the plungers with one side of a welding circuit, a guide arranged near the welding position, a carriage mounted upon the guide and movable toward and from the article in the welding position, a metallic jaw mounted upon the carriage and insulated therefrom, an insulating strip mounted upon the carriage to move therewith and shiftable laterally with relation to the carriage to press the wire against the metallic jaw, means to shift the strip laterally, means to connect the jaw with the other side of the welding circuit, and means to sever the wire.

29. Apparatus for attaching projections formed from wires to an article comprising, a guide device to receive the articles, a guide arranged near the guide device, a carriage mounted to move upon the guide device, said carriage having grooves, rigid insulating strips arranged within the grooves, means to hold the strips against longitudinal movement within the grooves and to permit of lateral movement with relation to the carriage, a lever pivoted upon the carriage and having a fork to engage the insulating strips, means to move the carriage, a jaw mounted upon the carriage and arranged opposite the strips, means to supply a welding current to the wires and article.

30. In apparatus for attaching a pin to a metal article, means to hold the metal article in a selected position, means to move the end of a wire into contact with the article and to cause pressure between the contacting parts of the end of the wire and article and to pull the wire in a direction from the article after the welding step to test the weld, and means for supplying a welding current to the contacting parts.

31. In apparatus for attaching a pin to a metal article, means for supporting the metal article in a selected position, a device for engagement with a wire and movable toward the article to effect the longitudinal feeding of the wire to bring the end of the wire into contact with the article, said device being also movable from the article and then serving to effect a pulling action upon the wire after the welding step to test the weld, means for supplying a welding current to the contacting parts, and means to sever the wire after the welding and pulling steps to separate the attached pin from the wire.

32. In apparatus for attaching pins to metal articles, means for supporting and advancing in succession a plurality of metal articles to a welding position, resilient means to support each article when shifted to the welding position, means to engage a wire and bring the wire into contact with the article and exert a pressure upon the article in opposition to the action of the resilient supporting means and thereby cause a pressure between the contacting parts of the wire and article, and means to supply a welding current to the contacting parts of the wire and article.

33. In apparatus for attaching a projection to an article, a guide device to receive the article, means to move the article in the guide device to a welding position, a device arranged in cooperative relation with the guide device and adapted to move a wire into contact with the article, automatic means to engage the article and properly locate the same prior to the contact between the wire and article, and means to supply a welding current to the contacting wire and article.

34. Apparatus for welding metallic parts, comprising means to move one part into contact with the other part, a pneumatic cell separate from the moving means and serving to support the second named part in opposition to the action of the moving means, the cell serving to instantly follow through during the welding step independently of the inertia of the moving means, and means to supply a welding current to the parts.

35. In apparatus for welding metallic parts, comprising a support, means mounted upon the support to move one metallic part a selected distance into contact with the other part and then hold the first named part in the selected shifted position, a pneumatic cell separate from the moving means and serving to support the second named part in opposition to the action of the moving means, the cell serving to instantly follow through during the welding step independently of the inertia of the moving means, means to control the pressure within the cell so that a selected pressure may be had therein, and means to supply a welding current to said metallic parts.

36. Apparatus for welding contacting metallic parts, comprising means disposed upon one side of the metallic parts and serving to press one part against the other part, a pneumatic cell disposed upon the opposite side of said metallic parts and separate from the pressing means and serving to support the second part in opposition to the action of pressing means so that the cell instantly follows through during the welding step independently of the inertia of the pressing means, and means to supply a welding current to the metallic parts.

37. Apparatus for welding metallic parts, comprising a relatively light metallic support for supporting one metallic part, means to move the other metallic part into contact with the metallic part supported by the relatively light metallic support, a pneumatic cell separate from the moving means and serving to support the relatively light metallic support in opposition to the action of the moving means, the cell serving to instantly follow through during the welding step independently of the inertia of the moving means, and a welding circuit connected with the moving means and the relatively light metallic support.

38. Apparatus for welding metallic parts, comprising a member to move one part into contact with the other part, means to move the member, a pneumatic cell separate from the moving means and urging said parts together, the cell serving to instantly follow through during the welding step independently of the inertia of the member, and means to supply a welding current to the parts.

HENRY KERSHAW.